United States Patent [19]

Miyadera

[11] Patent Number: 5,619,260
[45] Date of Patent: Apr. 8, 1997

[54] STILL VIDEO CAMERA PERFORMING WHITE-BALANCE AND AUTO-FOCUS ADJUSTMENT CONCURRENTLY

[75] Inventor: Shunichi Miyadera, Tokyo, Japan

[73] Assignee: Asahi Kogaku Kogyo Kabushiki Kaisha, Tokyo, Japan

[21] Appl. No.: 668,370

[22] Filed: Jun. 18, 1996

Related U.S. Application Data

[63] Continuation of Ser. No. 294,360, Aug. 23, 1994, abandoned.

[30] Foreign Application Priority Data

Sep. 6, 1993 [JP] Japan .................. 5-245979

[51] Int. Cl.⁶ .................................................. H04N 9/73
[52] U.S. Cl. .................. 348/223; 348/224; 348/262; 348/342; 348/349; 396/225
[58] Field of Search ................................ 348/223, 224, 348/262, 263, 264, 265, 268, 270, 272, 273, 276, 342, 345, 349, 350; 354/429, 430, 482, 483, 404; H04N 9/73

[56] References Cited

U.S. PATENT DOCUMENTS

| | | | |
|---|---|---|---|
| 4,335,397 | 6/1982 | Tamura | 358/29 |
| 4,626,918 | 12/1986 | Morisawa | 358/225 |
| 5,070,407 | 12/1991 | Wheeler et al. | 358/225 |
| 5,111,299 | 5/1992 | Aoki et al. | 358/209 |
| 5,132,825 | 7/1992 | Miyadera | 359/85 |
| 5,136,326 | 8/1992 | Yokota et al. | 354/476 |
| 5,136,674 | 8/1992 | Kakiuchi et al. | 385/115 |
| 5,155,635 | 10/1992 | Kakiuchi | 359/896 |
| 5,185,669 | 2/1993 | Kato | 358/227 |
| 5,198,890 | 3/1993 | Suga | 358/29 |
| 5,216,248 | 6/1993 | Ikeda et al. | 250/237 R |
| 5,398,058 | 3/1995 | Hattori | 348/224 |
| 5,543,837 | 8/1996 | Aoki et al. | 348/264 |

FOREIGN PATENT DOCUMENTS 56-6585   1/1981   Japan ............ H04N 9/04

Primary Examiner—John K. Peng
Assistant Examiner—Ngoc-Yen Vu
Attorney, Agent, or Firm—Greenblum & Bernstein P.L.C.

[57] ABSTRACT

A still-video camera has a white balance adjustment device. The white balance adjustment device includes a filter film which has a translucent opal filter portion and a transparent filter portion. The filter film is moved by a motor. During a white balance adjustment, the translucent opal filter portion is positioned in front of a first CCD, and in an image recording operation, the transparent filter portion is positioned in front of the first CCD. When the white balance adjustment is to be carried out, an output signal from a second CCD is transmitted to an AF control circuit, and thus an AF adjustment is also performed. The AF adjustment is carried out in such a manner that a spatial frequency of the output signal of the second CCD has a highest value.

14 Claims, 3 Drawing Sheets

STILL VIDEO CAMERA PERFORMING WHITE-BALANCE AND AUTO-FOCUS ADJUSTMENT CONCURRENTLY

This application is a continuation of application Ser. No. 08/294,360, filed Aug. 23, 1994, now abandoned.

BACKGROUND OF THE INVENTION

1. Field of the Invention

The present invention relates to a still-video camera having a plurality of imaging devices for obtaining a color image.

2. Description of the Related Art

In a known still-video camera, light from an object entering through a focusing lens is received by an imaging device, and a color still image formed therefrom is recorded on a recording medium. When using such a still-video camera, processes, such as a white balance adjustment, must be carried out before the image is recorded. The white balance adjustment in a TTL system, for example, is performed in a manner in which a translucent opal glass filter cap is attached in front of the taking lens, and a white balance adjustment coefficient is set such that an image of a white object obtained through the imaging device is reproduced as a white image.

Namely, during the operation of a conventional still-video camera, first, a white balance coefficient is stored in a memory of the camera, and then, an auto-focus (AF) adjustment is carried out. Accordingly, the preparations for recording the image includes an operation for attaching and detaching the translucent opal glass filter cap, which takes a long time.

SUMMARY OF THE INVENTION

Therefore, an object of the present invention is to provide a still-video camera in which the delay time, from turning on the still-video camera power supply until the still-video camera can record images, is shortened.

According to the present invention, there is provided a still-video camera which includes first and second imaging devices, a color temperature-sensing filter device, a white balance adjusting mechanism and a focusing mechanism.

The color-temperature-sensing filter device has an optical element movably disposed in front of a light receiving surface of the first imaging device. The white balance adjusting mechanism carries out a white balance adjustment in accordance with an output signal from the first imaging device which receives light through the optical element. The focusing mechanism moves a taking lens in accordance with an output signal of the second imaging device so that the taking lens focuses the image on the second imaging device. The white balance adjusting mechanism and the focusing mechanism are carried out substantially at the same time.

Further, according to the present invention, there is provided a still-video camera which includes first and second imaging devices, a filter, a white balance adjusting mechanism and a lens moving mechanism.

The filter is movable over the light receiving surface of the first imaging device. The white balance adjusting mechanism carries out a white balance adjustment in accordance with an output signal of the first imaging device when the filter covers the light receiving surface. The lens moving mechanism moves a taking lens in accordance with an output signal of the second imaging device so that the taking lens focuses the image on the second imaging device. At least part of the operation of the lens moving mechanism is carried out while the white balance adjustment is carried out.

Furthermore, according to the present invention, there is provided a still-video camera which includes an imaging device, a filter film, a winding mechanism and white balance adjusting mechanism.

The filter film includes a translucent white portion which can be positioned in front of a light receiving surface of the imaging device. The winding mechanism winds the filter film in such a manner that the translucent white portion can be positioned in front of the light receiving surface. The white balance adjusting mechanism carries out a white balance adjustment in accordance with an output signal of the first imaging device when the translucent white portion is positioned in front of the light receiving surface.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
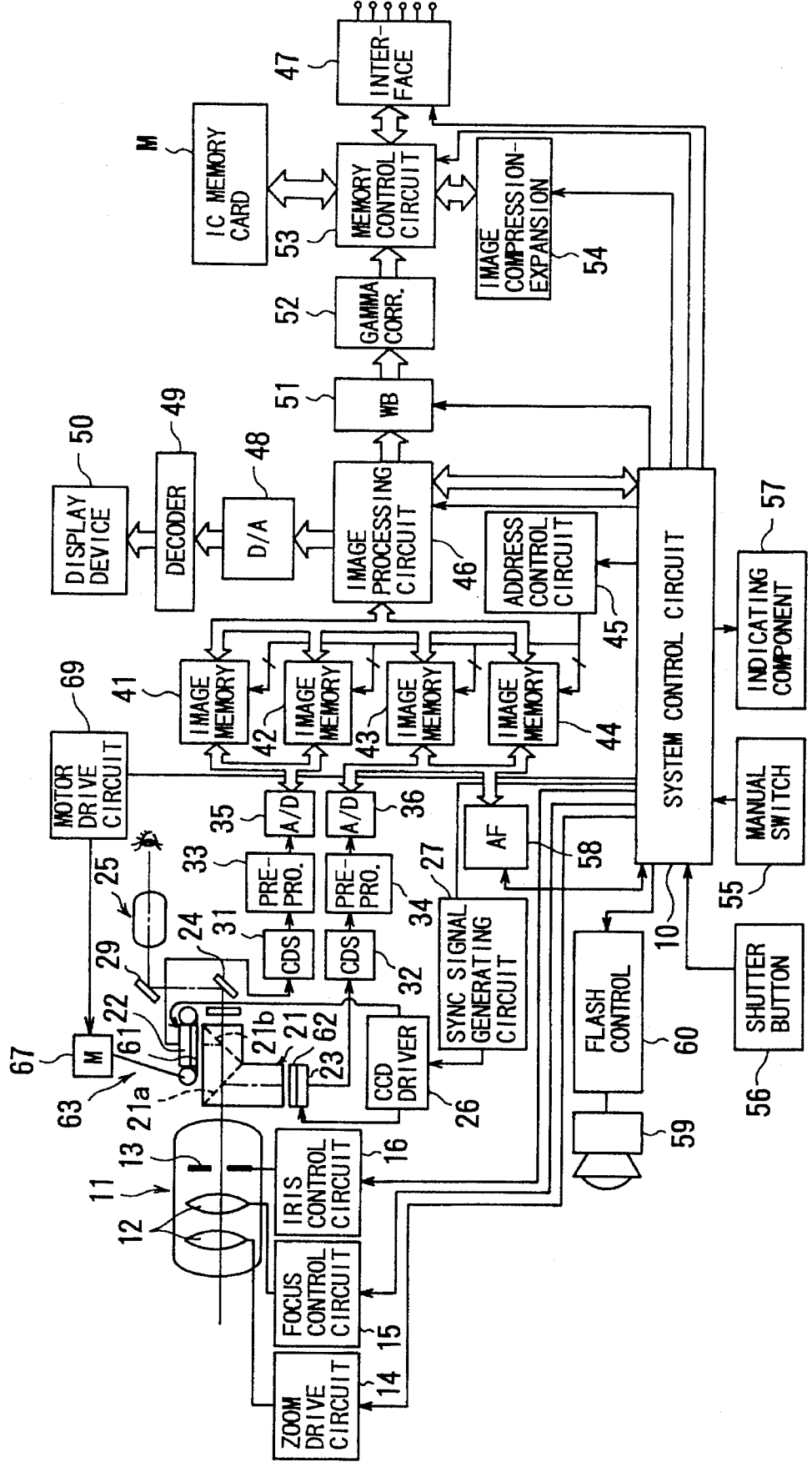
FIG. 1 is a block diagram showing a still-video camera to which an embodiment of the present invention is applied.

The present invention will now be described with reference to embodiments shown in the drawings.

FIG. 1 is a block diagram showing a still-video camera to which an embodiment of the present invention is applied.

An imaging optical system 11 has a taking lens 12 and an aperture 13. The taking lens 12 is composed of a plurality of lens elements and forms a zooming optical system. The positions of the lens elements of the taking lens 12, along an optical axis, are controlled by a zoom drive circuit 14 and a focus control circuit 15. The opening of the aperture 13 is adjusted by an iris control circuit 16. The zoom drive circuit 14, the focus control circuit 15 and the iris control circuit 16 are controlled by a system control circuit 10. The system control circuit 10 includes a microcomputer and controls an in-focus control, a color temperature adjustment and the still-video camera as a whole.

Light from an object passes through the imaging optical system 11 and is focused on a first imaging device (CCD) 22 and a second imaging device (CCD) 23, through a prism 21, so that the same images are formed on the CCDs 22 and 23. The light is also passed to a finder optical system 25, via the prism 21 and mirrors 24 and 29. The CCDs 22 and 23 are driven by a CCD driver 26, so that image signals corresponding to the images formed on the CCDs 22 and 23 are supplied to correlation-double-sampling (CDS) circuits 31 and 32 respectively. The CCD driver 26 is operated in accordance with a pulse signal outputted from a synchronizing signal generating circuit 27 controlled by the system control circuit 10.

The image signals inputted to the CDS circuits 31 and 32 are processed so that reset noise is removed, and then subjected to predetermined processes, such as gamma correction, in pre-process circuits 33 and 34. The image signals are then converted to digital signals by A-D converters 35 and 36, and stored in image memories 41 through 44. The addresses in the image memories 41 through 44, at which the image signals are stored, are controlled by the system control circuit 10 through an address control circuit 45.

An image signal processing circuit 46 is provided for applying a predetermined process to the image signals stored in the image memories 41 through 44, so that a luminance signal, an R-signal, a G-signal and a B-signal are outputted. These signals pass through the image processing circuit 46, a D-A converter 48 and a decoder 49, and are outputted to a display device 50 installed in the still-video camera. Further, these signals are outputted to a memory control circuit 53 through a white balance adjusting circuit 51 and a gamma correction circuit 52.

The memory control circuit 53 is provided for outputting an image signal formed according to a recording format for an IC-memory card M (a recording medium), and is controlled by the system control circuit 10 through an image compression-expansion circuit 54. The image compression-expansion circuit 54 compresses the R-signal, the G-signal and the B-signal in a time axis when recording on the recording medium M, and expands these signals in a time axis when reading them from the recording medium M. Namely, the R-signal, the G-signal and the B-signal inputted into the memory control circuit 53 are compressed and recorded on the recording medium M under control of the system control circuit 10.

In this still-video camera, the R-signal, the G-signal and the B-signal can be outputted to a computer or a display device, which are not shown, through an interface circuit 47.

A manual switch 55, a shutter button 56 and an indicating component 57 are connected to the system control circuit 10. The manual switch 55 and the shutter button 56 are provided for operating the still-video camera, and the indicating component 57 is provided for indicating the state of the manual switch 55.

This still-video camera has an electronic flash device 59 operated by the system control circuit 10 when the manual switch 55 is operated. The amount of light emitted by the electronic flash device 59 is controlled by the system control circuit 10 through an electronic flash control circuit 60.

The prism 21 has a first beam-splitter 21a and a second beam splitter 21b. The amount of light passed to the first and second CCDs 22, 23 and the finder optical system 25 are in the ratios 4:4:2; for example, by the operation of the beam splitters 21a and 21b, thus, light having the same intensity is passed to each of the CCDs 22 and 23. Namely, a part of the light entering the prism 21 from the optical system 11 is reflected by the first beam splitter 21a, and passed to the second CCD 23. The rest of the light passes through the first beam splitter 21a to the second beam splitter 21b. A part of the light is reflected by the second splitter 21b, and passed to the first CCD 22. The remaining light, i.e., the light which passes through the first and second beam splitters 21a and 21b, passes out of the prism 21. This light is reflected by the mirrors 24 and 29, and passed to the finder system 25.

Color filters 61 and 62 are disposed on the light receiving surfaces of the first and second CCDs 22 and 23, respectively, so that color components of the light reflected by the beam splitters 21a and 21b are sensed. These color filters 61 and 62 have the same construction and are complementary color filters with a checkerboard arrangement in which groups of green (G), magenta (Mg), yellow (Ye) and cyan (Cy) elements are arranged.

Figure 2:
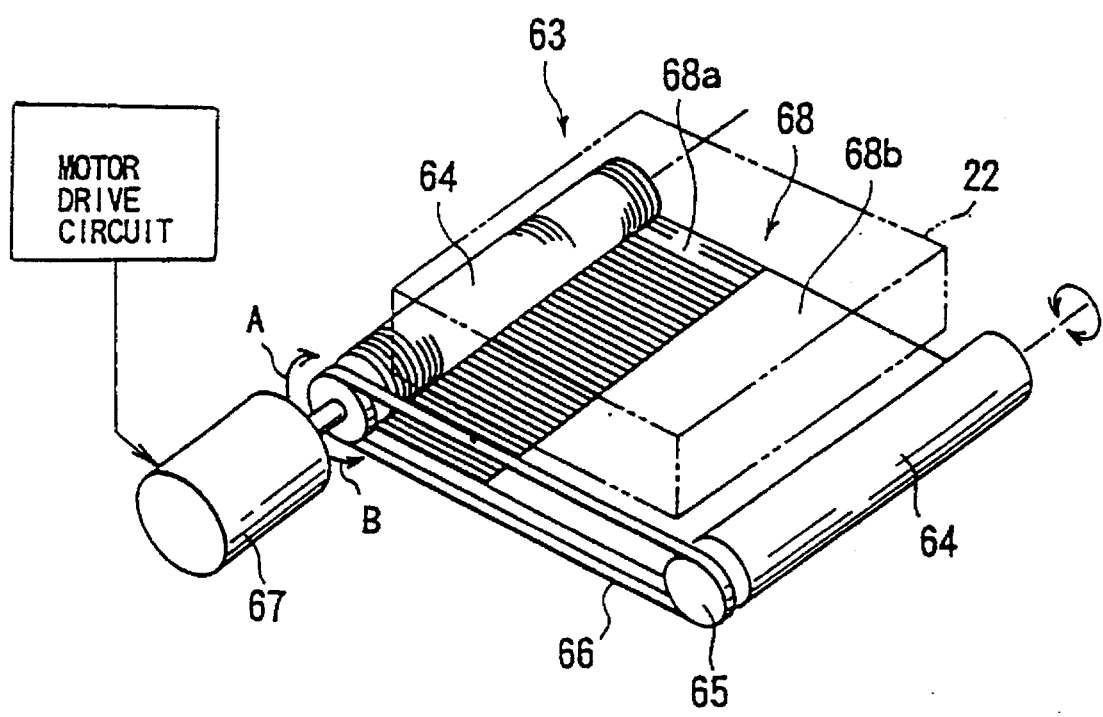
FIG. 2 is a perspective view showing an outside appearance of a filter drive device.

A filter drive device 63 (or a color temperature sensing filter device) as shown in FIG. 2 is provided between the first CCD 22 and the prism 21, so that a color temperature can be sensed and a white balance adjustment can be carried out. The filter drive device 63 has a pair of rollers 64, disposed at both sides of the first CCD 22, and a filter film 68 wound around the pair of rollers 64. Pulleys 65 are connected to the rollers 64, respectively, and an endless belt 66 is wound around the pulleys 65. One of the pulleys 65 is connected to an output shaft of the motor 67 driven by a motor drive circuit 69 (see FIG. 1). The filter film 68 has a translucent opal filter portion 68a, i.e., a translucent white portion, and a transparent portion 68b. The translucent opal filter portion 68a and the transparent filter portion 68b are connected to each other and have areas large enough to cover the light receiving surface of the first CCD 22.

The motor drive circuit 69 is controlled by the system control circuit 10, whereby the rollers 64 are rotated in such a manner that either the translucent opal filter portion 68a or the transparent filter portion 68b is located in front of the light receiving surface of the first CCD 22.

The white balance adjustment is carried out by the system control circuit 10 in such a manner that the first CCD 22 is driven at a speed higher than a usual operation to pick up an image signal, after the translucent opal filter portion 68a is positioned in front of the light receiving surface of the first CCD 22 by the motor drive circuit 69.

On the other hand, for performing an AF adjustment, an output signal from the second CCD 23 is supplied to an AF control circuit 58, in which the position of the taking lens 12 is obtained by a calculation so that the spatial frequency of an image formed on the second CCD 23 has the highest value. A drive signal corresponding to the lens position calculated by the AF control circuit 58 is outputted to the focus control circuit 15, and thus the taking lens 12 is moved to the correct position. Note that the operation of the AF control circuit 58 is started when the shutter button 56 is depressed and the release switch is turned ON.

Figure 3:
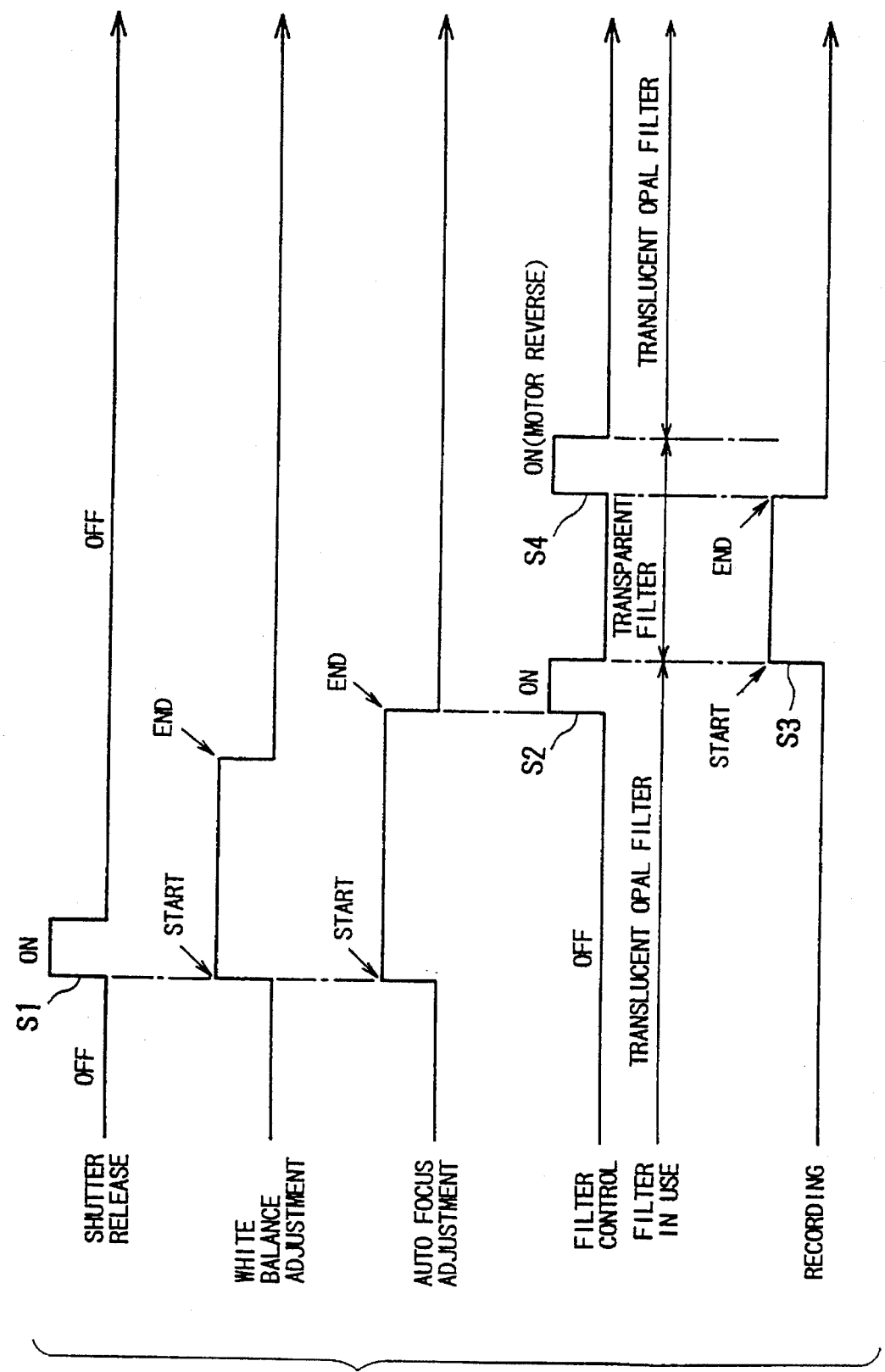
FIG. 3 is a timing chart of a photographing operation of the still-video camera.

FIG. 3 shows a timing chart of the white balance adjustment, the AF adjustment and image recording operation.

When it is determined at time S1 that the release switch is turned ON, a white balance adjustment and an AF adjustment are started at the same time.

In the white balance adjustment process, the translucent opal filter portion 68a is positioned in front of the first CCD 22. Then, the first CCD 22 is operated by the CCD driver 26 under control of the system control circuit 10, so that an output signal (an image signal) is read out from the first CCD 22 at a high speed. Namely, the synchronizing signal generating circuit 27 is controlled by the system control circuit 10 so that a high speed clock signal for controlling the CCD driver 26 is outputted by the synchronizing signal generating circuit 27.

The output signal is inputted to the image process circuit 46 through the image memories 41 through 44. In the image process circuit 46, the three primary color signals, i.e., R, G and B signals, are generated in accordance with the input signal, and supplied to the white balance adjusting circuit 51 (FIG. 1). In the system control circuit 10, the ratios R/G and B/G are calculated based on the R, G and B signals, and white balance adjustment coefficients (amplification factors for the B and G signals) are obtained so that a proper white balance is obtained. In the white balance adjusting circuit 51, the input signals are amplified in accordance with the white balance adjustment coefficients, and thus, a white balance adjustment process is performed.

On the other hand, in the AF adjustment, the second CCD 23 is operated by the CCD driver 26, and the position of the taking lens 12 is controlled in such a manner that the spatial frequency of an image signal obtained by the second CCD 23 has the highest value. Thus, the taking lens 12 is moved to an in-focus state.

As described above, in this embodiment, the white balance adjustment and the AF adjustment are started at the same time, but the white balance adjustment ends earlier than the AF adjustment. Thus, the white balance adjustment and the AF adjustment are carried out at substantially the same time.

When the white balance adjustment and the AF adjustment processes end, at time S2, the motor 67 of the filter drive device 63 is rotated in a direction shown by arrow A in FIG. 2, and thus, the translucent opal filter portion 68a moves away from CCD 22, and the transparent filter portion 68b is positioned in front of the CCD 22.

Note that, in this embodiment, when the white balance adjustment is completed, the AF adjustment has also been completed. Therefore, the retreat of the translucent opal filter portion 68a from the CCD 22 is started when the AF adjustment has ended. However, the retreat of the translucent opal filter portion 68a can be started after the white balance adjustment is completed, even if the AF adjustment has not been completed.

Then, at time S3, an image recording operation is performed. Namely, the CCD driver 26 is controlled by the system control circuit 10, so that any residual electric charge which has accumulated on the first and second CCDs 22 and 23 up to that time is discharged, and then, a real exposure of each of the CCDs 22 and 23 is carried out. After a predetermined time has passed, the accumulated electric charges on each of the CCDs 22 and 23 are transferred and the output signals of the CCDs 22 and 23 are picked up. The output signals of the CCDs 22 and 23 are subjected to predetermined processes in circuits such as the A/D converters 35 and 36 and the gamma correction circuit 52, and thus, an image signal corresponding to the object is generated. The image signal is recorded to the IC memory card M, which is a recording medium, through the memory recording circuit 53. After this recording operation, at time S4, the motor 67 of the filter drive circuit 63 is driven in a direction shown by arrow B in FIG. 2 for the next photographing operation, and the translucent opal filter portion 68a is again located in front of the CCD 22.

As described above, in the embodiment, a translucent opal filter portion 68a is provided in the camera body of the still-video camera, and thus, before an image recording operation, when the shutter release is carried out, a white balance adjustment is performed using the CCD 22 while an AF adjustment is performed using the CCD 23. Therefore, according to the embodiment, the time for attaching and detaching a translucent opal filter cap for a white balance adjustment, which must be carried out in a conventional device, is not required, and further, the white balance adjustment and the AF adjustment need not be carried out sequentially as in the conventional device. Accordingly, according to the embodiment, the time, from turning on the power supply of the still-video camera until an image can be recorded, is considerably shortened.

Further, according to the embodiment, since a white balance adjustment is performed at every shutter release operation, an operation in which an image is recorded without a white balance adjustment being performed is prevented.

Note that, although the embodiment is constructed in such a manner that an AF adjustment and a white balance adjustment are carried out immediately before a real exposure operation is performed, the AF adjustment, the white balance adjustment and a photometry measurement may be performed at the same time in synchronization with the photometry measurement which is carried out by a half-depression of a shutter button.

Further note that, although the translucent opal filter portion 68a is used as a color temperature sensing filter in the embodiment, a diffuser can be used for a white balance adjustment instead of the translucent opal filter portion 68a.

Still further note that, although the still-video camera is a dual-CCD-type having two CCDs 22 and 23 in the embodiment, the present invention can be applied to a triple-CCD-type still-video camera which has three CCDs transforming red, blue and green components to electric signals and which has a color temperature sensing filter provided on one the three CCDs.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 5-245979 (filed on Sep. 6, 1993) which is expressly incorporated herein, by reference, in its entirety.

I claim:

1. A still video camera, comprising:

at least first and second imaging devices, a same image being formed on each of said at least first and second imaging devices;

a color temperature sensing filter device having an optical element selectively disposed in front of a light receiving surface of said first imaging device;

white balance adjusting means for carrying out a white balance adjustment in accordance with an output signal of said first imaging device when said first imaging device receives light through said optical element;

focusing means for moving a taking lens in accordance with an output signal of said second imaging device so that said taking lens moves to an in-focus state; and means for combining said same images formed on each of said at least first and second imaging devices to form a frame color image, said white balance adjusting means and said focusing means being carried out substantially at the same time.

2. A still-video camera according to claim 1, said optical element comprising a translucent opal filter used for said white balance adjustment.

3. A still-video camera according to claim 1, said optical element comprising a diffuser used for said white balance adjustment.

4. A still-video camera according to claim 1, said color temperature sensing filter device comprising a pair of rollers disposed at both sides of said first imaging device, a filter film having a translucent opal filter portion and a transparent filter portion which are connected to each other and have areas large enough to cover said light receiving surface, said filter film being wound around said pair of rollers, and means for rotating said rollers in such a manner that one of said translucent opal filter portion and said transparent filter portion is located in front of said light receiving surface.

5. A still-video camera according to claim 1, said focusing means moving said taking lens so that a spatial frequency of an image formed on said second imaging device has a highest value.

6. A still-video camera according to claim 1, said operation of said white balance adjusting means and said operation of said focusing means being started at the same time.

7. A still-video camera according to claim 1, said operation of said white balance adjusting means and said operation of said focusing means being started when a release switch is activated.

8. A still-video camera according to claim 1, further comprising:

means for controlling said color temperature sensing filter device in such a manner that said optical element moves away from said first imaging device after said white balance adjustment is completed.

9. A still-video camera according to claim 8, further comprising:

means for applying a predetermined process to signals outputted from said at least first and second imaging devices to generate an image signal corresponding to one frame; and means for recording said image signal to a recording medium.

10. A still-video camera according to claim 1, said same image formed on said at least first and second imaging devices during a single photographing operation.

11. A still-video camera, comprising:

at least first and second imaging devices, a same image being formed on each of said first and second imaging devices;

a filter movable to cover a light receiving surface of said first imaging device and to move away from said light receiving surface;

means for carrying out a white balance adjustment in accordance with an output signal of said first imaging device when said filter covers said light receiving surface;

means for moving a taking lens in accordance with an output signal of said second imaging device so that said taking lens moves to an in-focus state, at least a part of said lens moving operation being carried out while said white balance adjustment is carried out; and means for combining said same images formed on each of said at least first and second imaging devices to form a frame color image.

12. A still-video camera according to claim 11, said same image formed on said at least first and second imaging devices during a single photographing operation.

13. A still-video camera, comprising:

at least first and second imaging devices, a same image being formed on each of said first and second imaging devices;

a filter film comprising a translucent opal portion which can be positioned in front of a light receiving surface of said first imaging device;

means for winding said filter film in such a manner that said translucent opal portion covers said light receiving surface and moves away from said light receiving surface;

means for carrying out a white balance adjustment in accordance with an output signal of said first imaging device when said translucent opal portion is positioned in front of said light receiving surface; and means for combining said same images formed on each of said at least first and second imaging devices to form a frame color image.

14. A still-video camera according to claim 13, said same image formed on said at least first and second imaging devices during a single photographing operation.

* * * * *